United States Patent
Inoue et al.

[11] Patent Number: 6,027,831
[45] Date of Patent: *Feb. 22, 2000

[54] SQUARE TYPE ENCLOSED STORAGE BATTERY

[75] Inventors: Hiroshi Inoue; Kenji Sato; Munehisa Ikoma; Hiromi Kajiya, all of Toyohashi, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/997,210

[22] Filed: Dec. 23, 1997

[30] Foreign Application Priority Data

Dec. 26, 1996 [JP] Japan ................................ 8-347249

[51] Int. Cl.⁷ ............................. H01M 2/30; H01M 2/26; H01M 2/06
[52] U.S. Cl. ....................... 429/181; 429/161; 429/179; 429/211
[58] Field of Search ................................ 429/181, 161, 429/211, 179

[56] References Cited

U.S. PATENT DOCUMENTS

| | | |
|---|---|---|
| 1,453,791 | 5/1923 | Gossling . |
| 4,098,966 | 7/1978 | Brown . |
| 5,158,842 | 10/1992 | McHenry . |

FOREIGN PATENT DOCUMENTS

| | | |
|---|---|---|
| 0 139 834 | 5/1985 | European Pat. Off. . |
| 0 769 820 | 4/1997 | European Pat. Off. . |
| 2 382 773 | 9/1978 | France . |
| 2 651 606 | 3/1991 | France . |
| 49-88221 | 7/1974 | Japan . |
| 54-171143 | 12/1979 | Japan . |
| 55-143776 | 11/1980 | Japan . |
| 57-15356 | 1/1982 | Japan . |
| 57-19969 | 2/1982 | Japan . |
| 57-23869 | 2/1982 | Japan . |
| 57-34651 | 2/1982 | Japan . |
| 59-114750 | 7/1984 | Japan . |
| 61-42776 | 3/1986 | Japan . |
| 61-99966 | 6/1986 | Japan . |
| 1-124953 | 5/1989 | Japan . |
| 3-76360 | 7/1991 | Japan . |
| 2 133 609 | 7/1984 | United Kingdom . |

OTHER PUBLICATIONS

European Search Report dated Jan. 27, 1997 for application No. 96307593.2.

European Search Report dated Apr. 20, 1998 for EP 97 31 0594.

*Primary Examiner*—John S. Maples
*Attorney, Agent, or Firm*—Ratner & Prestia

[57] ABSTRACT

The invention relates to a square type enclosed storage battery of medium to large capacity, more particularly to a technology for realizing high volume capacity density or high output density, and is hence intended to present a square type enclosed storage battery of medium to large capacity of high reliability and small temperature rise, comprising a electrode plate group laminating plural layers of positive plates 8a and negative plates 8b through separators 8c, and a synthetic resin case 10 for accommodating the electrode plate group 8, in which a nickel-made terminal 2 has a pair of screws 2a as external output terminals of positive and negative electrodes, a pole portion 2b, a sealing groove 2c, and a current collector 2f, their central axes are designed to be nearly on a same line, plural current collectors 2f project from a flange 2d to the electrode plate group side, and the terminal 2 is fixed by a synthetic resin cover

25 Claims, 10 Drawing Sheets

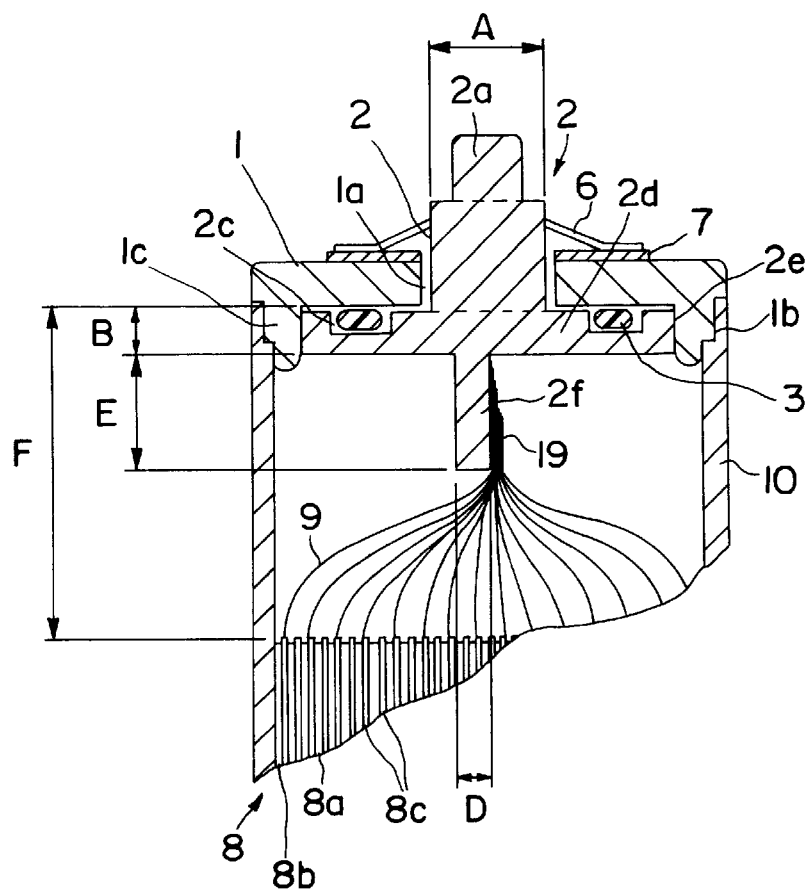
FIG. 3(A)
PRIOR ART
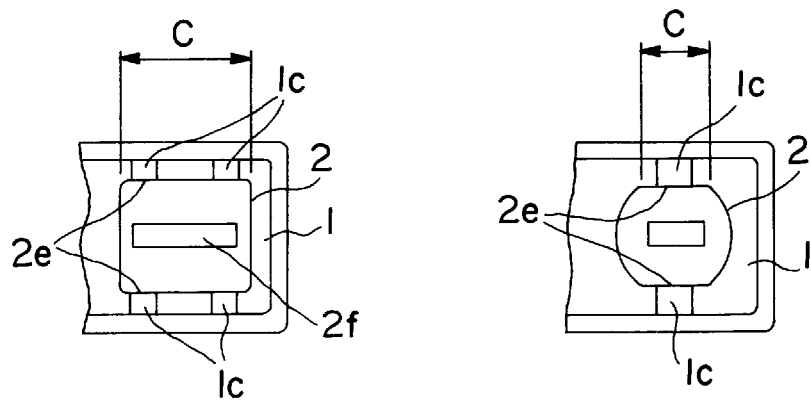
FIG. 3(B)
PRIOR ART
FIG. 3(C)
PRIOR ART

SQUARE TYPE ENCLOSED STORAGE BATTERY

BACKGROUND OF THE INVENTION

1. Field of the Invention

The present invention relates to a square type enclosed storage battery of medium to large capacity, and more particularly to a technology for realizing high volume capacity density or high output density.

2. Description of the Prior Art

Hitherto, the demand for secondary battery was mainly occupied by the small cells for use in power source of portable appliances such as camcorder, and the development has been mainly promoted in the direction of smaller size and larger capacity. Recently, there is an increasing demand for high performance secondary batteries of medium capacity or large capacity, ranging from scores to hundreds of Ah, such as the stationary secondary battery used as no-break power unit or the emergency power source installed in computer system, and secondary battery used as a mobile power source used in electric vehicle (hereinafter called EV) and other motor-driven vehicle developed for environmental or energy measure.

Among them, for example, the secondary battery used for moving an EV or the like is required to have a high output, high energy density, and high reliability, capable of withstanding the large current load of over 100 A (amperes), in order to obtain acceleration, cruising distance and reliability equally competitive with an internal-combustion engine such as gasoline engine. In this background, to surpass the performance of the improved lead storage battery being hitherto considered for EV use, the nickel-cadmium storage battery, nickel-hydrogen storage battery, other alkaline secondary battery, and moreover, for use in future, lithium secondary battery are being researched and developed as promising batteries satisfying these requirements.

In such promising battery system of square type enclosed storage batteries of medium to large capacity, the conventional current collector structure was as shown in FIG. 3 (A), in which a lead plate 9 coming out from a electrode plate group 8 is connected to one current collector 2f projecting from a flange 2d, and an electric power (energy) accumulated in the electrode plate group 8 is taken out of the battery, and therefore if attempted to shorten the distance F from the upper end of the electrode plate group to the cover inside ceiling wall, when connecting the current collector 2f and the lead plate 9, in particular, the lead plate 9 at the outermost side of the electrode plate group 8 is deformed by force, and a short circuit occurs due to disconnected welding of the lead plate 9 with positive electrode plate 8a or negative electrode plate 8b, or twisting of the lead plate 9, and hence the distance from the electrode plate group 8 to the terminal 2 was long (Japanese Laid-open Utility Model No. 55-22971). Or, in order to connect a cell and a cell electrically, when fixing a connection plate by using a screw 2a of the terminal 2, the locking structure around the terminal 2 was only holding of the periphery of the terminal 2 at two to four positions by fixing ribs 1c of the cover 1 as shown in FIG. 3 (B) or (C).

Besides, in a terminal 2 as shown in FIG. 4, a lead plate 9 coming out from a electrode plate group 8 is connected to a current collector 2f at a position eccentric from a screw 2a, a pole portion 2b, and a sealing groove 2c of the terminal 2, and an electric power (energy) accumulated in the electrode plate group 8 is delivered to outside of the battery, and in this current collecting structure, the lead plates are gathered rationally and the distance from the electrode plate group 8 to the terminal 2 is shortened, and thereby the electrode plate occupying volume in the cell is increased and the volume capacity density is enhanced. However, the current feeding distance from the electrode plate group 8 to the terminal 2 was long (U.S. Pat. No. 5,158,842).

To realize the volume and capacity density (the energy per unit volume of cell) and output density (the output capacity per unit weight of cell) required in such storage battery of high performance, it is necessary to reduce the electric resistance value from the electrode plate group to the terminal, and to deliver the accumulated electric power (energy) to outside of the cell at a minimum limit of loss, as well as to improve the characteristic of the positive and negative plates and to study the optimum composition condition of electrode plate group using them. Moreover, a higher voltage is required for higher output, and the reliability for series connection of about 10 to 250 cells is needed.

In the current collecting structure of the conventional square type enclosed storage battery of medium to large capacity, no consideration was given to handling of large current such as discharging always at 100 A or more and charging by regenerative brake of an equal capacity, or reliability for series connection of 10 to 250 cells in order to obtain high voltage. Therefore, in the conventional current collecting structure as shown in FIG. 3 (A), since the current feeding distance from the electrode plate group 8 to the terminal 2 is long, the electric resistance value is large from the terminal 2 to the lead plate 9, and the Joule heat in this area was very large.

Still more, for electric connection of a cell and a cell by using the screw 2a of the terminal 2, in the procedure of series connection of hundreds of cells, a torque of 250 to 300 kgfcm may be applied, while the usual coupling torque ranges from 70 to 200 kgfcm, due to fluctuation of coupling torque (excessive torque) by mechanical work, and such torque may cause to rotate the terminal 2 or dislocate the terminal 2 from the lead plate 9, or the screw is loosened by deformation of connection plate to be coupled by increase of shaft power of screw coupling, thereby increasing the electric resistance value. Or, in the terminal 2 shown in FIG. 4, in the storage battery of the current collecting structure in which the lead plate 9 coming out from the electrode plate group 8 is connected to the current collector 2f at a position eccentric from the screw 2a, pole portion 2b, and sealing groove 2c of the terminal 2, since the annular packing 3 is not pressed uniformly, there is also a problem of electrolyte leak, and since it is used in high voltage state in a narrow space of EV or the like, if electrolyte leaks from the terminal, even in some cells, the leak current may lead to discharge, short circuit, heat generation, fire or electric shock.

It is hence not applicable to the battery for EV or the like handling large current such as discharging always at 100 A or more and charging by regenerative brake of an equal capacity, in which high volume capacity density, high output density, long life, and high reliability are required.

Reduction of temperature rise of battery by lowering of electric resistance value brings about an improvement of charging efficiency for the alkaline secondary battery which is inferior in charging efficiency in high temperature atmosphere, and also brings about an improvement of battery life characteristic by suppressing deterioration of electrode plate active substance due to heat. This is because in the battery for EV handling large current such as discharging always at 100 A or more and charging by regenerative brake of an equal capacity (in the EV, in order to utilize the energy effectively, the motor works as generator when applying the brake, and the generated electric energy is charged in the storage battery, which is characteristic of this system), the temperature rise of battery due to Joule heat (=square of current×electric resistance; the electric resistance being proportional to the length of conductor and inversely proportional to the sectional area) is very significant. The EV is often charged right after running. It means that the battery is charged in high temperature state after the temperature is raised by running. Further, if the electrode plate compound is always held at high temperature, deterioration of the compound is accelerated, and the life of the storage battery is shortened. Therefore, suppression of battery temperature rise by lowering of Joule heat is very important for improving the charging efficiency and enhancing the battery life.

DISCLOSURE OF THE INVENTION

It is hence an object of the invention to solve the problems of the prior art and present a square type enclosed storage battery of medium to large capacity, high in volume capacity density, high in output density, high in reliability, and small in temperature rise.

To achieve the object, the invention provides a square type enclosed storage battery accommodating a electrode plate group composed by alternately laminating positive plates and negative plates through separators, and electrolyte in its inside, and comprising a case sealed by a cover provided with a safety vent and terminals, in which a lead plate coming out from each positive plate, and a lead plate coming out from each negative plate are individually connected. In the terminal for storage battery, central axes of the screw, pole portion, sealing groove and current collector are nearly on a same line, and plural current collectors project from the flange, and the sum of electric resistance values of lead plates of both positive side and negative side and the terminal is 0.04 times to 0.30 times of the electric resistance value between the positive side terminal and the negative side terminal of the square type enclosed storage battery.

It is further preferred in the following conditions. Firstly, the pole portion diameter A is 12 to 20 mm; secondly, the flange thickness B is 2 to 10 mm; thirdly, the stopper length C is 25 to 45 mm; fourthly, the current collector width D is 1 to 5 mm, and the current collector projecting height E is 2 to 10 mm; fifthly, the distance F from the upper end of the electrode plate group to the inside ceiling wall of the cover is 4 to 20 mm; sixthly, the lead plate width G coming out from the electrode plate is 0.15 to 0.30 times of the electrode plate width H; seventhly, the lead plate thickness coming out from the electrode plate is 0.175 to 0.50 times of the electrode plate thickness; eighthly, the lateral direction auxiliary part height I of the lead plate placed at the upper end of the electrode plate is 0.0175 to 0.060 times of the filling or adhesion height J of the electrode plate compound; ninthly, the total area of junction surface 19 of the terminal 2 and lead plate 9 is 0.1 to 0.7 times of the total sectional area of the connected lead plates 9; and tenthly, connection of terminal 2 and lead plate 9 is achieved by at least one of welding, screw tightening, riveting, and crimping.

BRIEF DESCRIPTION OF THE DRAWINGS

FIG. 2 (B) is a bottom view of cover and terminal used in the square type enclosed storage battery according to the embodiment of the invention.

FIG. 2 (C) is a perspective view of terminal used in the square type enclosed storage battery according to the embodiment of the invention.

FIG. 3 (A) is a partial sectional view as seen from the shorter side of a square type enclosed storage battery according to a prior art.

FIG. 3 (B) is a bottom view of cover and terminal used in the square type enclosed storage battery according to the prior art.

FIG. 3 (C) is a bottom view of cover and terminal used in a square type enclosed storage battery according to other prior art.

FIG. 7 (B) is a diagram showing the relation of sum of resistance values of lead plate and terminal and the ratio of total resistance value of storage battery, and highest temperature of battery by 100 A continuous discharge.

DESCRIPTION OF THE PREFERRED EMBODIMENTS

Figure 2A:
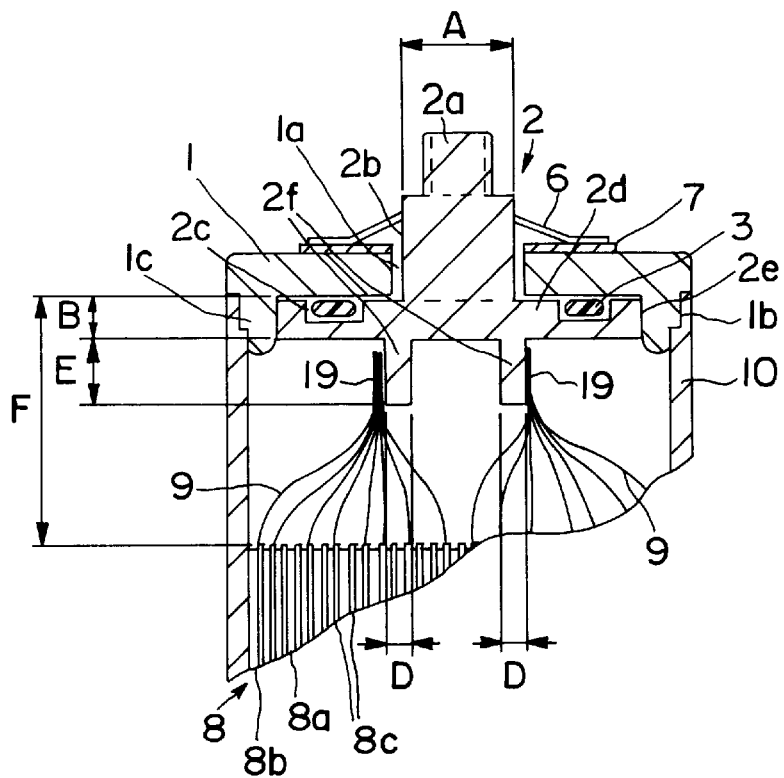
FIG. 2 (A) is a partial sectional view as seen from the shorter side of the square type enclosed storage battery according to the embodiment of the invention.
Figure 2B:
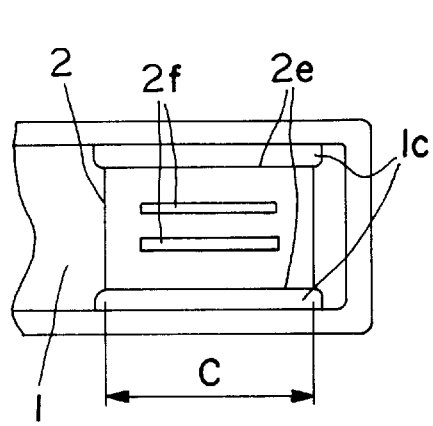
Figure 2C:
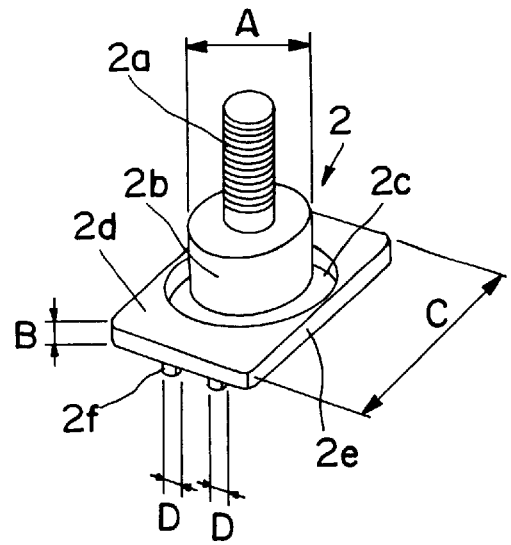

In FIG. 2, a square type enclosed storage battery accommodates a electrode plate group 8 composed by alternately laminating positive plates 8a and negative plates 8b through separators 8c, and electrolyte in its inside, and comprises a case 10 sealed by a cover 1 provided with a safety vent 11 and terminal 2, wherein the terminal 2 comprises a pair of screws 2a as external output terminals of positive and negative electrodes, a pole portion 2b, a sealing groove 2c, a flange 2d and current collectors 2f, and plural current collectors 2f project from the flange 2d to the electrode plate group side. Central axes of each one of the screw 2a, pole portion 2b, sealing groove 2c, and current collector 2f are designed to be nearly aligned on a same line, and the sum of electric resistance values of lead plates 9 of both positive side and negative side and the terminal is 0.04 times to 0.30 times of the electric resistance value between the positive side terminal and the negative side terminal of the square type enclosed storage battery, so that the Joule heat from the lead plates 9 and terminal 2 is reduced. Since the Joule heat is a loss of electric power, its decrease leads to elevation of output density. At the same time, the battery temperature rise is suppressed, and the charging efficiency and life characteristic of the battery are improved. Moreover, the electrolyte leak resistance is enhanced and the reliability of the battery is upgraded.

Additional conditions are described below.

(1) By defining the pole portion diameter A from 12 to 20 mm, deformation of connection plate when electrically connecting a cell and a cell is suppressed, screw loosening is prevented, increase of resistance is prevented, and the Joule heat is decreased.

(2) By defining the flange thickness B from 2 to 10 mm, the lead plates 9 coming out from the electrode plate group 8 can be stably connected to the current collector 2f, and further the current passage is shortened, so that the Joule heat is decreased. Besides, the electrode plate occupying volume in the cell increases, and the volume capacity density is increased.

(3) By defining the stopper length C from 25 to 45 mm, dislocation of the terminal 2 and lead plates 9 due to fluctuation of coupling torque (excessive torque) can be prevented, increase of resistance value is prevented, and the Joule heat is reduced.

(4) By defining the current collector width D from 1 to 5 mm, and the current collector projection height E from 2 to 10 mm, the lead plates 9 coming out from the electrode plate group 8 can be stably connected to the current collector 2f so that the current passage is shortened, and hence the Joule heat is decreased. Besides, the electrode plate occupying volume in the cell increases, and the volume capacity density is increased.

(5) By defining the distance F from the upper end of the electrode plate to the inside ceiling wall of the cover from 4 to 20 mm, the current passage is shortened, and the Joule heat is decreased. Besides, the electrode plate occupying volume in the cell increases, and the volume capacity density is increased.

(6) By defining the width G of the lead plate coming out from the electrode plate from 0.15 to 0.30 times of the electrode plate width H, the resistance of the lead plate 9 is decreased, and the Joule heat is reduced.

(7) By defining the thickness of the lead plate coming out from the electrode plate to 0.175 to 0.50 times of the electrode plate thickness, the electric resistance value of the lead plate 9 is decreased, and the Joule heat is reduced.

(8) By defining the height I of the lateral direction auxiliary part of the lead plate placed on the upper end of the electrode plate from 0.0175 to 0.060 times of the filling or adhesion height J of the electrode plate compound, the electric resistance value between the electrode plate and lead plate is decreased, and the Joule heat is reduced.

(9) By defining the total area of the junction surface 19 of the terminal 2 and lead plate 9 from 0.1 to 0.7 times of the total sectional area of lead plates 9, and connecting the terminal 2 and lead plates 9 at least by one of welding, screw tightening, riveting and crimping methods, the contact resistance value is decreased, and the Joule heat is reduced.

In this way, the high volume capacity density, high output density, high reliability, high charging efficiency, and long life can be achieved.

(Embodiment 1)

Referring now to the drawings, the invention is specifically described below mainly relating to an embodiment of a square type enclosed alkaline storage battery with an electric capacity of about 30 to 100 Ah, being studied mainly for use in a power source of an electric vehicle.

Figure 1:
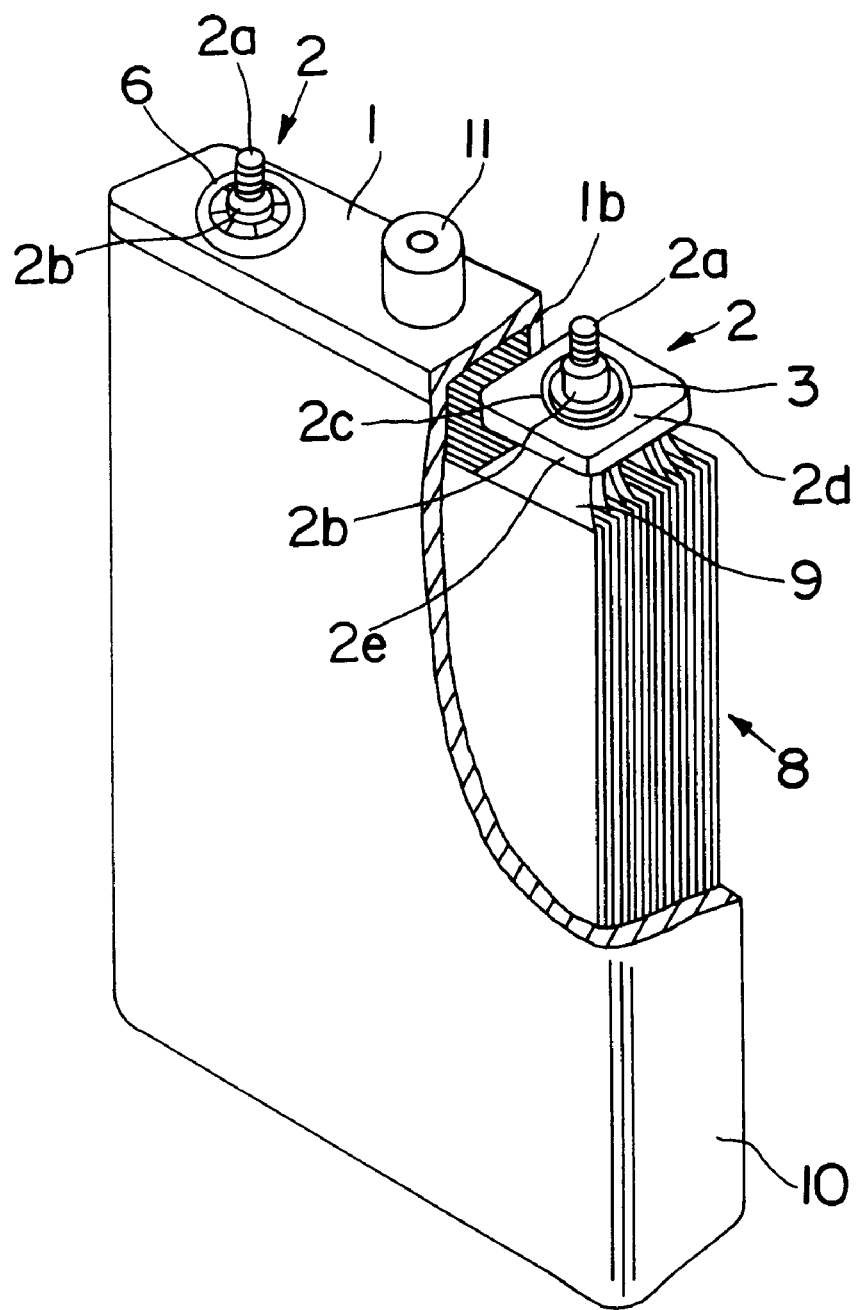
FIG. 1 is a partially cut-away perspective view of a square type enclosed storage battery according to an embodiment of the invention.
Figure 5:
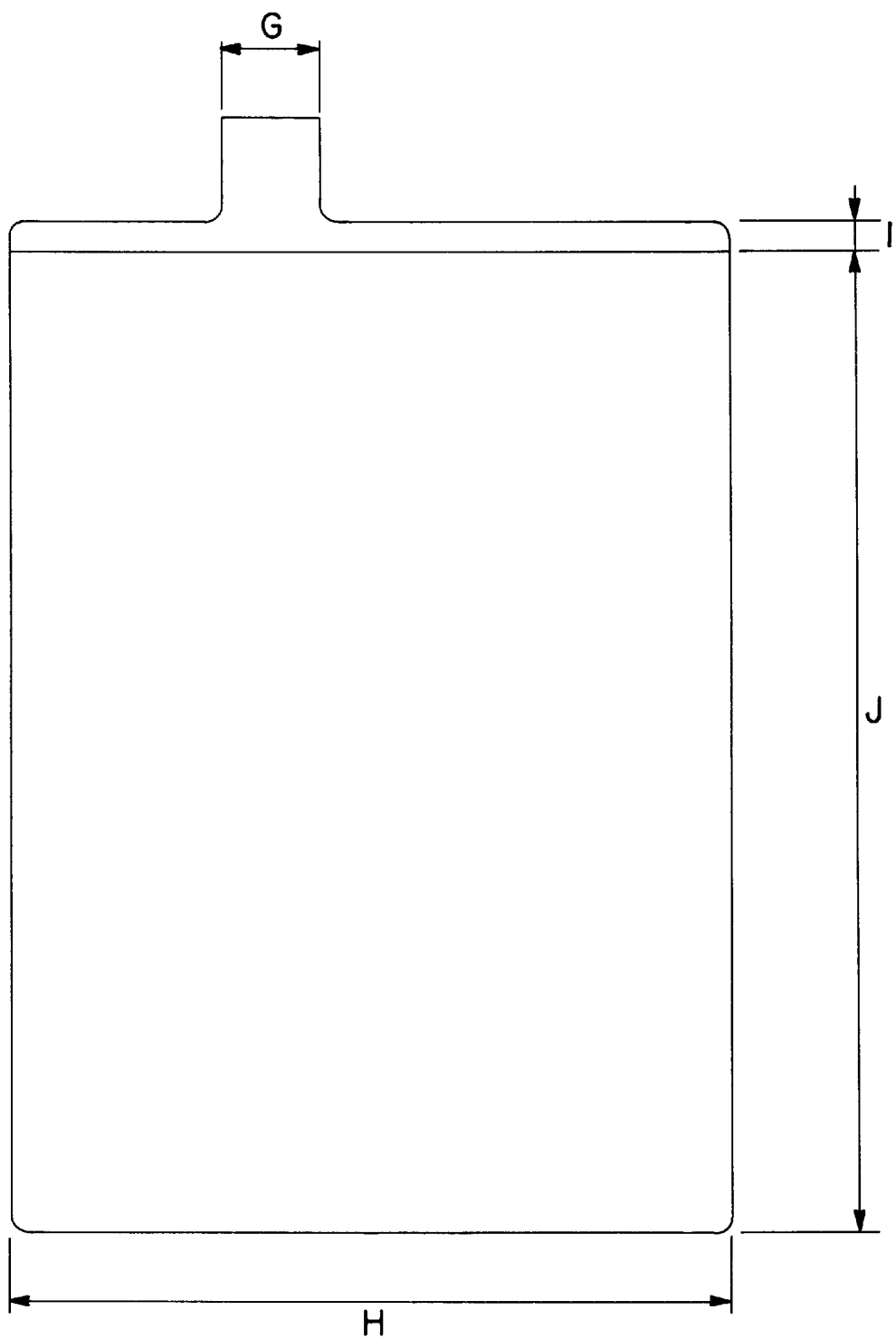
FIG. 5 is a front view of electrode plate and lead plate.

FIG. 1 is an essential drawing partly cutting away a case 10 and a cover 1 of a completed product of 100 Ah square type enclosed alkaline secondary storage battery of the invention, enclosed by using the case 10 of a rectangular section and the cover 1. FIG. 2 (A) is a sectional view as seen from the shorter side of the same battery. FIG. 2 (B) is a view from the current collector side of the terminal 2 of the same battery. FIG. 2 (C) is a perspective view of the terminal for the storage battery of the invention. FIG. 5 shows the appearance of the electrode plate and lead plate.

In the diagrams, reference numeral 8 denotes a electrode plate group composed by laminating plural layers of positive plates 8a filled with nickel active substance such as nickel hydroxide, and negative plates 8b coated with hydrogen occlusion alloy or the like, through intervening non-woven separators 8c, and impregnating a specified amount of an alkaline electrolyte, and 10 is a synthetic resin case for accommodating the electrode plate group 8. The nickel-made terminal 2 comprises a pair of screws 2a as external output terminals of positive and negative electrodes, a pole portion 2b, a sealing groove 2c, a flange 2d, and current collectors 2f, and plural current collectors 2f project from the flange 2d to the electrode plate group side. Central axes of each one of the screw 2a, pole portion 2b, sealing groove 2c, and current collector 2f are designed to be nearly aligned on a same line. The pole portion 2b is inserted into an insertion hole 1a together with an annular packing 3, and the terminal 2 is fixed to the synthetic resin cover 1 by an annular compressive spring 6 so as to hold by a fixing rib 1c provided in the cover 1. Reference numeral 11 is a synthetic resin safety vent which functions when the battery internal pressure climbs up abnormally. The lead plates 9 of the positive plates 8a and negative plate s 8b are joined to the upper ends of the positive plates 8a and negative plates 8b by welding, and are further welded and connected to the both outermost sides of the current collector 2f as shown in FIG. 2 (A). The cover 1 fixing the terminal 2 is placed in the opening of the case 10 accommodating the electrode plate group 8, and is integrally affixed to the sealing portion 1b by adhesion or heat fusion means, thereby enclosing the battery.

Incidentally, in the diagrams, symbol A denotes the diameter of the pole portion 2b, B is the thickness of the flange 2d, C is the length of the stopper 2e, D is the width of the current collector 2f, E is the projection height of the current collector 2f, F is the distance from the upper end of the electrode plate group 8 to the inside ceiling wall of the cover 1, G is the width of the lead plate 9, H is the width of positive plates 8a and negative plates 8b for composing the electrode plate group 8, I is the lateral direction auxiliary part height of the lead plates 9, and J is the filling or adhesion height of the compound of the positive plates 8a and negative plates 8b for composing the electrode plate group 8.

(Embodiment 2)

In the terminal 2 for the storage battery of embodiment 1, and the square type enclosed storage battery using the same, 100 cells of storage battery were fabricated by defining the pole portion diameter A at 16 mm, the flange thickness B at 3 mm, the stopper length C at 32 mm, the current collector width D at 2 mm, the lead connection projection height E at 5 mm, the distance F from the upper end of the electrode plate group to the cover inside ceiling wall at 11 mm, the lead plate width G at 25 mm, the thickness of the lead plates 9 at 0.15 mm, the width H of the positive plates and negative plates at 103 mm, the lateral direction auxiliary part height I of the lead plates at 4 mm, the filling or adhesion height J of the compound of the positive plates and negative plates for composing the electrode plate group at 134 mm, and the junction total area at 24 mm$^2$, by joining the terminals and lead plates by welding.

(Comparative example 1)

In the condition of Embodiment 2, the junction structure shown in FIG. 2 (A) was replaced by the conventional structure shown in FIG. 3 (A), in which the lead plate 9 coming out from the electrode plate group 8 was connected to one current collector 2f coming out from the flange 2d, and the electric power (energy) accumulated in the electrode plate group was delivered to outside of the battery, and using the terminal 2 for storage battery in such current collector structure, 100 cells of square type enclosed storage battery were fabricated.

In the storage battery of comparative example 1, in the process of welding and connecting the lead plates 9 coming out from the electrode plate group 8 and the terminals 2 in the midst of fabrication of battery, the outermost lead plate 9 of the electrode plate group 8, in particular, is deformed by force, and short circuit due to disconnection of welding of the lead plate 9 and positive plate 8a or negative plate 8b or twisting of lead plate 9 occurred in all of 100 cells, and the battery was not manufactured completely. In the storage battery of embodiment 1, the distance between the electrode plate group 8 and the terminal 2 can be shortened without deforming the lead plate 9 by force, and short circuit due to disconnection of welding of the lead plate 9 and positive plate 8a or negative plate 8b or twisting of lead plate 9 occurred in none of the 100 cells. In deforming the lead plate without force, if the current collector width D is less than 1 mm, the connection of the terminal 2 and lead plate 9 is deformed due to lack of strength in the current collector 2f, and is hence unstable, and the junction resistance value becomes large. When exceeding 5 mm, the specific resistance of the current collector 2f is sufficiently small, and hence by comparing embodiment 1 and embodiment 2 in the weight of the terminal 2 by defining the current collector width D at 6 mm, only the weight is increased by about 9 g per terminal, and hence the merit is lost.

If the current collector height E is less than 2 mm, it is impossible connect by welding, screw tightening, riveting or other crimping connection method, or if exceeding 10 mm, there is no space necessary for deforming the lead plate 9 without force, and hence short circuit due to disconnection of welding of the lead plate 9 and positive plate 8a or negative plate 8b or twisting of lead plate 9 occurs. If the flange thickness B is less than 2 mm, it is impossible to form a sealing groove 2c for fitting an annular packing 3 considering the alkaline liquid setting resistance, and if exceeding 10 mm, necessary space for deforming the lead plate 9 without force cannot be kept, and short circuit due to disconnection of welding of the lead plate 9 and positive plate 8a or negative plate 8b or twisting of lead plate 9 occurs, and further the specific resistance component of the flange occupied in the specific resistance of the terminal becomes larger due to increase of the current feeding distance, and the specific resistance of the terminal 2 becomes very large, and comparing embodiment 1 and embodiment 2 in the weight of the terminal 2 of which flange thickness B is 11 mm, the weight is increased as much as about 57 g per terminal.

Thus, in the terminal 2 for storage battery having plural current collectors 2f projecting from the flange 2d, by defining the flange thickness B from 2 to 10 mm, the current collector width D from 1 to 5 mm, and the current collector projection height E from 2 to 10 mm, the distance from the electrode plate group 8 to the terminal 2 can be shortened without causing effects on other functions, and as the electrode plate occupying volume in the cell increases, the volume capacity density increases, and further the current feeding distance from the electrode plate group 8 to the terminal 2 is shortened, and the electric resistance value from the electrode plate group 8 to the terminal 2 is reduced, so that the Joule heat can be decreased.

(Comparative example 2)

Figure 4:
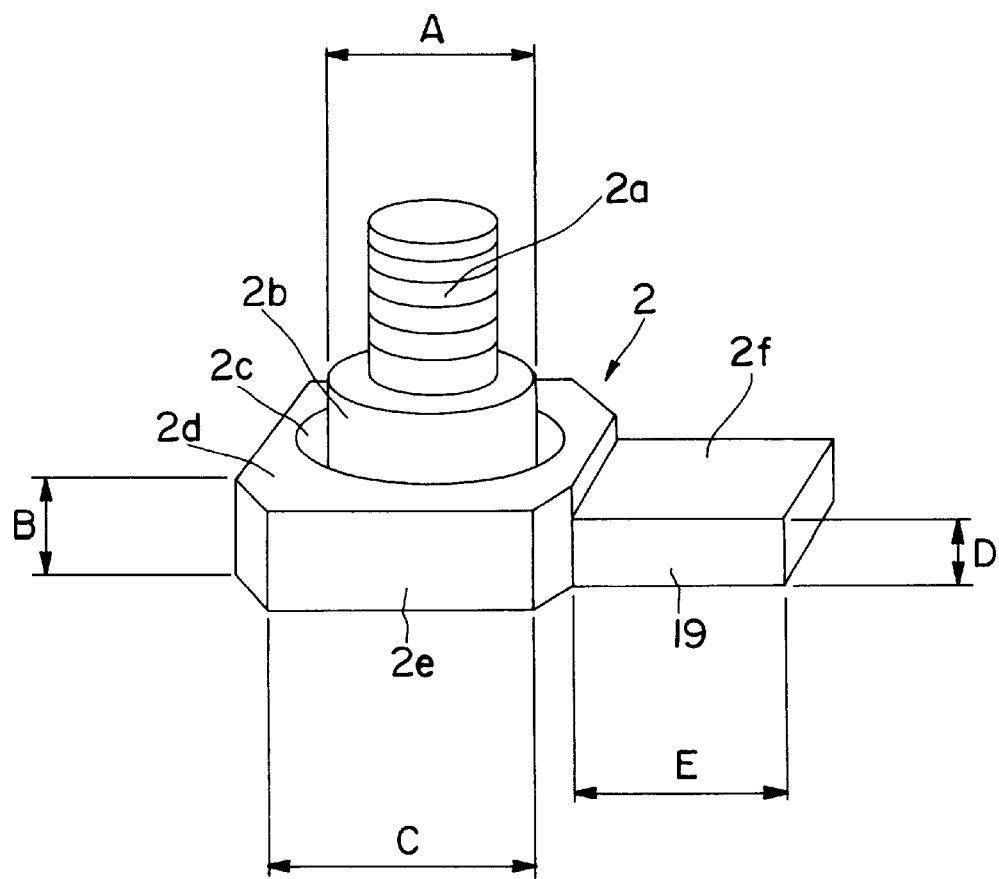
FIG. 4 is a perspective view of terminal used in a square type enclosed storage battery according to a prior art.

In the condition of Embodiment 2, current feeding structure shown in FIG. 2 (A) was replaced by terminal 2 in the conventional structure shown in FIG. 4, connected to the lead plate 9 of which lead plate width G coming out from the electrode plate group 8 is 14 mm and the lead junction 2f of which current collector projection height E is 15 mm at the position eccentric from the screw 2a, pole portion 2b, and sealing groove 2c, and the square type enclosed storage battery was fabricated by using such terminal 2 for storage battery.

Figure 6:
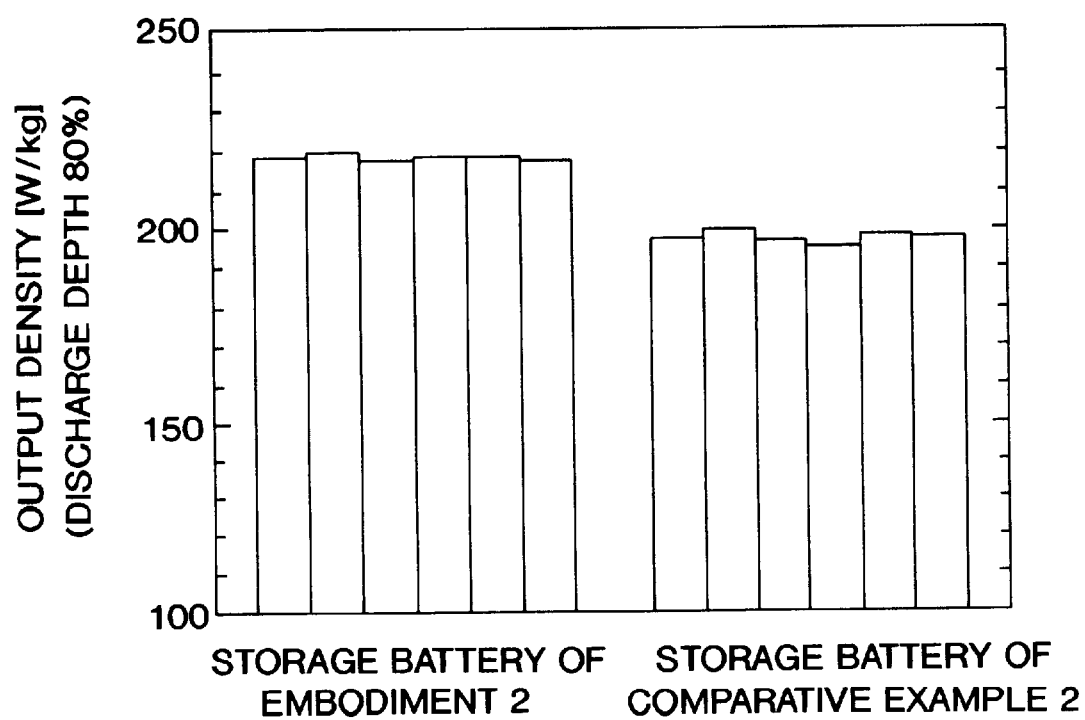
FIG. 6 is a diagram showing the relation of the output density at discharge depth 80% in embodiment 2 and comparative example 2.

In the storage battery in comparative example 2, by keeping a deforming distance of the lead plate 9 in the terminal 2, and shortening the distance from the electrode plate group 8 to the terminal 2 without deforming the lead plate 9 by force, the volume occupied by the pole plates in the cell is increased, and the volume capacity density is increased. However, when delivering the electric power (energy) accumulated in the electrode plate group 8 to outside of the battery, the current feeding distance from the electrode plate group 8 to the terminal 2 for the current passage including the pole portion 2b and screw 2a through the longitudinal direction of the lead plate 9, current collector 2f and flange 2f was long, and the electric resistance value from the electrode plate group 8 to the terminal 2 was not decreased. Conforming to embodiment 1 and comparative example 2, six cells were fabricated each, and investigated by the tests according to SBA 12503 at initial ambient temperature of 25° C., and FIG. 6 shows results of comparison of output density at discharge depth 80% (hereinafter, the output density is determined in the test condition above). As known from FIG. 6, the difference in output density by the shape of the terminal is clear.

Thus, by using the terminal 2 for storage battery uniform in the central axes of the screw 2a, pole portion 2b, and current collector 2f, the current feeding distance from the electrode plate group 8 to the terminal 2 can be shortened, and the electric resistance from the electrode plate group 8 to the terminal 2 is decreased, so that the Joule heat can be reduced.

Moreover, fabricating 100 cells each of the battery of embodiment 2 and the storage battery of comparative example 2, the electrolyte leak resistance was tested. As the test condition, 100 cells of the sample storage battery each in fully charged state were tested in the repeated environment of a cycle of a total of 24 hours (one day) of two sessions of temperature change from 25° C. and humidity 90% to 65° C. and humidity 90% for 2.5 hours, holding at 65° C. and humidity 90% for 3 hours, and temperature change from 65° C. and humidity 90% to 25° C. and humidity 90% for 2.5 hours, holding at 25° C. and humidity 90% for 2 hours, holding at −15° C. for 3.5 hours, and holding at 25° C. for 2.5 hours, and in days 7, 14, 30, and 50, presence or absence of alkaline reaction was checked in the peripheral area of the external projection of the terminal 2 by using pH test paper. The results are shown in Table 1.

TABLE 1

| Sample | Duration of test No. of cells leaking electrolyte | | | |
|---|---|---|---|---|
|  | 7 days | 14 days | 30 days | 50 days |
| Embodiments 2 | 0 | 0 | 0 | 2 |
| Comparative Example 2 | 0 | 15 | 51 | 91 |

As clear from Table 1, as compared with the invention, the electrolyte leak resistance is poor in comparative example 2 of the conventional structure. The storage battery of comparative example 2 was disassembled and investigated into the cause, and it was discovered in the conventional structure as follows: when fixing the terminal 2 to the cover 1 by the annular compressive spring 6, by using the screw 2a, the terminal 2, the lead plate 9 connected to the terminal 2, and the electrode plate group 8 connected to this lead plate 9 are pulled up and fixed, and therefore since the central axes of the screw 2a, pole portion 2b, sealing groove 2c, and current collector 2f are not identical, the terminal 2 is inclined to the current collector 2f side, and the annular packing 3 is not pressed uniformly to the cover 1. In the invention, by contrast, since the central axes of the screw 2a, pole portion 2b, sealing groove 2c, and current collector 2f are identical, when fixing the terminal 2 to the cover 1 by the annular spring 6, the terminal 2 is not inclined, and the annular packing 6 is pressed uniformly to the cover 1, so that the electrolyte leak resistance is enhanced.

Thus, by using the terminal 2 for storage battery uniform in the central axes of the screw 2a, pole portion 2b, sealing groove 2c, and current collector 2f, the electrolyte leak resistance can be enhanced.

(Embodiment 3)

Similar to the foregoing embodiment 2, the cover 1, the terminal 2 with the stopper length C of 25 mm, annular packing 3, and annular compressive spring 6 are individually prepared, and, as shown in FIG. 2 (B), it was assembled by holding the stopper 2e by the fixing rib 1c provided in the cover 1.

(Embodiment 4)

Similar to the foregoing embodiment 3, it was assembled by defining the stopper length C at 35 mm.

(Embodiment 5)

Similar to the foregoing embodiment 3, it was assembled by defining the stopper length C at 45 mm.

(Comparative example 3)

Similar to the foregoing embodiment 3, it was assembled by defining the stopper length C at 24 mm.

(Comparative example 4)

Similar to the foregoing embodiment 3, it was assembled by defining the stopper length C at 46 mm.

(Comparative example 5)

Similar to the foregoing embodiment 3, defining the stopper length C at 24 mm, the terminal holding structure shown in FIG. 2 (B) was assembled in the structure conforming to the conventional structure in FIG. 3 (B).

(Comparative example 6)

Similar to the foregoing embodiment 3, defining the stopper length C at 24 mm, the terminal holding structure shown in FIG. 2 (B) was assembled in the structure conforming to the conventional structure in FIG. 3 (C).

Samples of embodiments 3, 4, 5 and comparative example 3,4, 5, 6 were presented for torque application tests. Applied torques were 200, 250, 300, 350 kgfcm, and 100 cells were fabricated for each torque, and a nut was inserted into the screw 2a of the terminal 2, and by using this nut, the torque was applied by a torque wrench when tightening the nut, and it was checked if the terminal 2 was rotated or not. Results are shown in Table 2.

TABLE 2

| Sample | Torque No. of rotations of terminal | | | |
|---|---|---|---|---|
|  | 200 kgfcm | 250 kgfcm | 300 kgfcm | 350 kgfcm |
| Embodiment |  |  |  |  |
| 3 | 0 | 0 | 0 | 12 |
| 4 | 0 | 0 | 0 | 5 |
| 5 | 0 | 0 | 0 | 2 |
| Comparative Example |  |  |  |  |
| 3 | 0 | 0 | 12 | 38 |
| 4 | 0 | 0 | 0 | 0 |
| 5 | 0 | 24 | 78 | 100 |
| 6 | 0 | 56 | 100 | 100 |

As clear from Table 2, by the torque of up to 300 kgfcm, there was no abnormality in the fixing portion in any sample of the invention, and rotation of terminal was not recognized. On the other hand, in comparative examples 3, 5, 6, some samples rotates by the torque of up to 300 kgfcm. In particular, in comparative examples 5, 6 conforming to the conventional structure, rotation was noted at the torque of 250 kgfcm. Even in the structure similar to the invention, when the stopper length C was less than 24 mm, it was impossible to withstand the torque of up to 300 kgfcm as clear from comparative example 3. Or, in the comparative example 4 in which the stopper length C was 46 mm, it was capable of enduring the torque of up to 350 kgfcm, and the torque resistance was substantially enhanced, but the quality was excessive, and comparing the weight of the terminal 2 between embodiment 3 and comparative example 4, the weight increase per terminal was about 13 g, and hence it is not necessary to set the stopper length C more than 46 mm.

Thus, by using the terminal 2 for storage battery of which stopper length C is in a range of 25 to 45 mm, if an excessive torque is applied due to fluctuation of coupling torque when connecting a cell and a cell, the terminal 2 is not turned, and the terminal 2 and lead plate 9 are not separated. Therefore, the electric resistance value from the electrode plate group 8 to the terminal 2 is not increased, so that the reliability can be enhanced.

(Embodiment 6)

Conforming to the foregoing embodiment 2, two terminals 2 with the screw 2a of M8 and pole portion diameter A of 16 mm, a nickel plated copper connector of 56 mm in length, 20 mm in width, and 2 mm in thickness, with holes of 8.6 mm in diameter drilled at pitches of 36 mm at positions symmetrical to the central axis in the lengthwise direction, and a galvanized M8 iron nut were prepared, and the two terminals 2 were inserted into the 8.6 mm diameter holes in the connector in the screw 2a, and by tightening at a torque of 300 kgfcm by the nut, the two terminals 2 were electrically connected.

(Embodiment 7)

Similar to the foregoing embodiment 5, a pole portion diameter A was connected at 12 mm.

(Embodiment 8)

Similar to the foregoing embodiment 5, a pole portion diameter A was connected at 20 mm.

(Comparative example 7)

Similar to the foregoing embodiment 5, a pole portion diameter A was connected at 11 mm.

(Comparative example 8)

Similar to the foregoing embodiment 6, a pole portion diameter A was connected at 21 mm.

Connecting 100 cells each of samples of embodiments 6, 7, 8 and comparative examples 7, 8, screw loosening test was conducted before and after storage. The storage condition was 65° C., 1000 hours, and the checking method was to apply equivalent torque to the coupling torque 300 kgfcm before storage, and check for presence or absence of nut rotation. Results are shown in Table 3.

As clear from Table 3, in the invention, rotation of nut was not recognized in any sample. In comparative example 7, on the other hand, nut rotation was noted in some. That is, when the pole portion diameter A receiving the connection plate is less than 11 mm, the force (about 500 kgf) for pressing the connection plate from the nut generated by tightening the nut with 300 kgfcm exceeds the tensile stress of the copper which is the material of the connection plate, and hence the nut is distorted by deformation of the copper plate. Results are shown below.

TABLE 3

| Sample | Number of sets rotating after storage |
| --- | --- |
| Embodiment | |
| 6 | 0 |
| 7 | 0 |
| 8 | 0 |
| Comparative Example | |
| 7 | 34 |
| 8 | 0 |

In the case of the pole portion diameter A of 12 mm, the area subtracting the hole area provided in the connection plate from the pole portion diameter area (connection plate pressure bearing area) is 55 cm$^2$, and the value dividing the pressing force of 500 kgf on this sectional area (the stress applied to the connection plate) is 9 kgf/cm$^2$, which is equal to the tensile stress of the copper, 9 kgf/cm$^2$. By contrast, in the case of the pole diameter A of 11 mm, from the same connection formula, the connection plate pressure bearing area is 37 cm$^2$, and the stress value applied on the connection plate is 14 kgf/cm$^2$, which exceeds the tensile stress of the copper.

(Embodiment 9)

Conforming to embodiment 2, a square type enclosed storage battery was fabricated by using the terminal 2 for storage battery with the pole portion diameter A of 20 mm.

(Comparative example 9)

Conforming to embodiment 2, a square type enclosed storage battery was fabricated by using the terminal 2 for storage battery with the pole portion diameter A of 21 mm.

Fabricating 100 cells each of the storage batteries of embodiment 9 and comparative example 9, the electrolyte leak resistance was tested. As the test condition, 100 cells of the sample storage battery each in fully charged state were tested in the repeated environments of a cycle of a total of 24 hours (one day) of two sessions of temperature change from 25° C. and humidity 90% to 65° C. and humidity 90% for 2.5 hours, holding at 65° C. and humidity 90% for 3 hours, and temperature change from 65° C. and humidity 90% to 25° C. and humidity 90% for 2.5 hours, holding at 25° C. and humidity 90% for 2 hours, holding at 15° C. for 3.5 hours, and holding at 25° C. for 2.5 hours, and in days 7, 14, 30, and 50, presence or absence of alkaline reaction was checked in the peripheral area of the external projection of the terminal 2 by using pH test paper. The results are shown in Table 4.

TABLE 4

| | Duration of test No of cells leaking electrolyte | | | |
| --- | --- | --- | --- | --- |
| Sample | 7 days | 14 days | 30 days | 50 days |
| Embodiment 9 | 0 | 0 | 0 | 5 |
| Comparative Example 9 | 0 | 0 | 22 | 69 |

As clear from Table 4, as compared with embodiment 9 of the invention, the electrolyte leak resistance is poor in comparative example 9. The comparative example 9, as compared with embodiment 9, is wider in the sealing surface by the annular packing 3, and the flat surface area for pressing the cover 1 of the annular compressive spring 6 for fixing the terminal 2 to the cover 1 is smaller as the pole portion diameter A increases due to limitation of the storage battery size, and when fixing the annular compressive spring 6, the flat portion of the annular compressive spring 6 is deformed to be corrugated in the circumferential direction. As a result, the pressing force for pressing the annular packing 3 through the cover 1 by the annular compressive spring 6 is uneven in the circumferential direction. Therefore, by increasing the pole portion diameter A, expansion of the seal surface and the pressing force to the annular packing 3 become uneven, and hence the electrolyte leak resistance is lowered, and hence the pole portion diameter A preferred to be 20 mm or less.

Thus, by using the terminal 2 for storage battery of which pole portion diameter A is 12 to 20 mm, the nut is not loosened when connecting a cell and a cell, and the electric resistance value from the electrode plate group 8 to the terminal 2 is not increased, and the electrolyte leak resistance is not lowered, so that a high reliability is obtained.

In the storage battery of embodiment 1, the sum of the electric resistance values of lead plates of both positive side and negative side and terminals and the output density of the battery are compared.

Figure 7A:
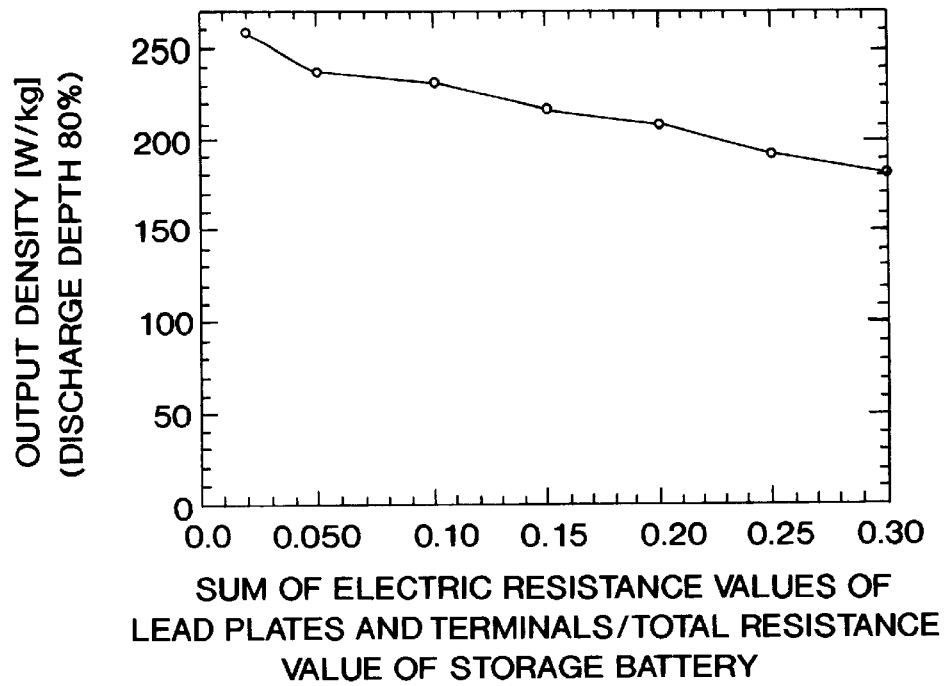
FIG. 7 (A) is a diagram showing the relation of sum of resistance values of lead plate and terminal and the ratio of total resistance value of storage battery, and the output density at discharge depth 80%.
Figure 7B:
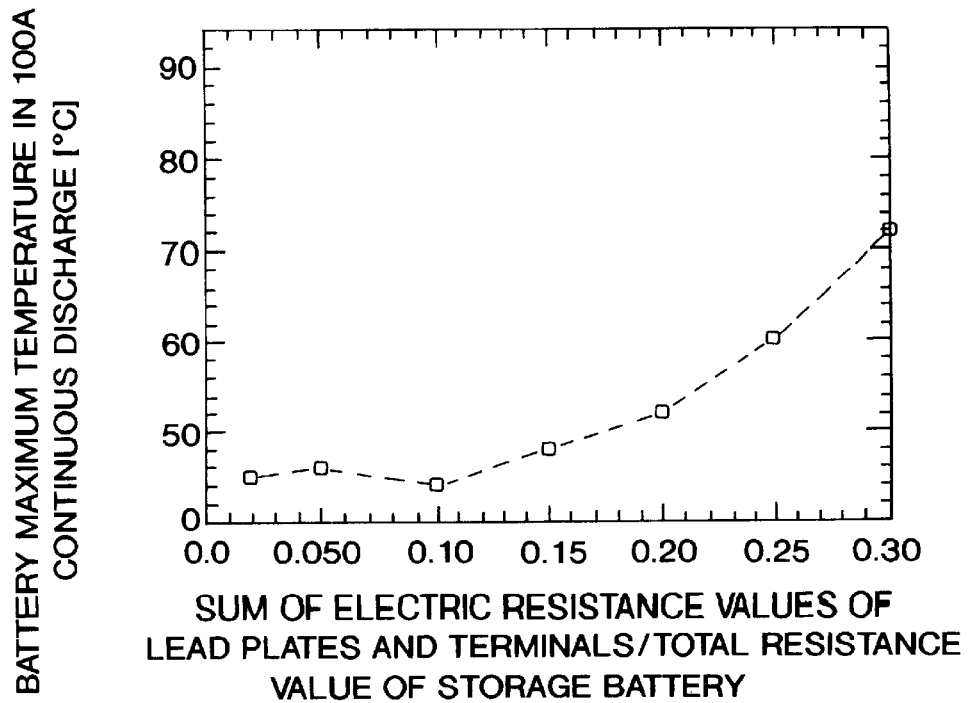

In FIG. 7 (A), the axis of ordinates denotes the output density at discharge depth 80%, in (B), the axis of ordinates denotes the maximum battery temperature in 100 A continuous discharged, and in both (A) and (B), the axis of abscissas represents the result of dividing the sum of the electric resistance values of lead plates of both positive side and negative side and terminals divided by the electric resistance between the positive terminal and negative terminal (hereinafter called the battery total resistance). The battery total resistance was calculated by determining the difference of intermediate voltage in 20 A discharge and 100 A discharge, and dividing it by the difference of the discharge current values (80 A). As known from FIG. 7, the output density decreases almost linearly as the value of dividing the sum of the electric resistance values of both positive and negative lead plates and terminals by the battery total resistance becomes larger. However, the maximum battery temperature in 100 A continuous discharge elevates abruptly when the value of dividing the sum of the electric resistance values of lead plates and terminals by the battery total resistance exceeds 0.30 because the Joule heat in the battery exceeds the heat release to outside of the battery. Technically, it was impossible to fabricate a battery of which value of the sum of the electric resistance values of terminals divided by the battery total resistance is smaller than 0.04. Therefore, the value of the sum of the electric resistance values of lead plates and terminals divided by the battery total resistance is preferred to be in a range from 0.04 times to 0.30 times. More preferably, the range should be from 0.04 times at which the battery temperature hardly raised to 0.20 times. Although not shown, if smaller than 0.30 times, as compared with those more than that, the battery temperature is lower in the cycle, and it is found both charging efficiency and life characteristic are excellent.

In the storage battery in embodiment 1, the distance F from the electrode plate upper end to the cover inside ceiling wall, volume capacity density of battery, and output density are compared. In the storage battery of embodiment 1, the lead plate thickness was defined at 0.15 mm, lead plate width B at 14 mm, lateral direction auxiliary part height I of lead plate at 4 mm, electrode plate width H at 103 mm, filling or adhesion height J of electrode plate compound at 134 mm, and junction total area at 24 mm$^2$, by connecting the terminals 2 and lead plates 9 by welding.

Figure 8:
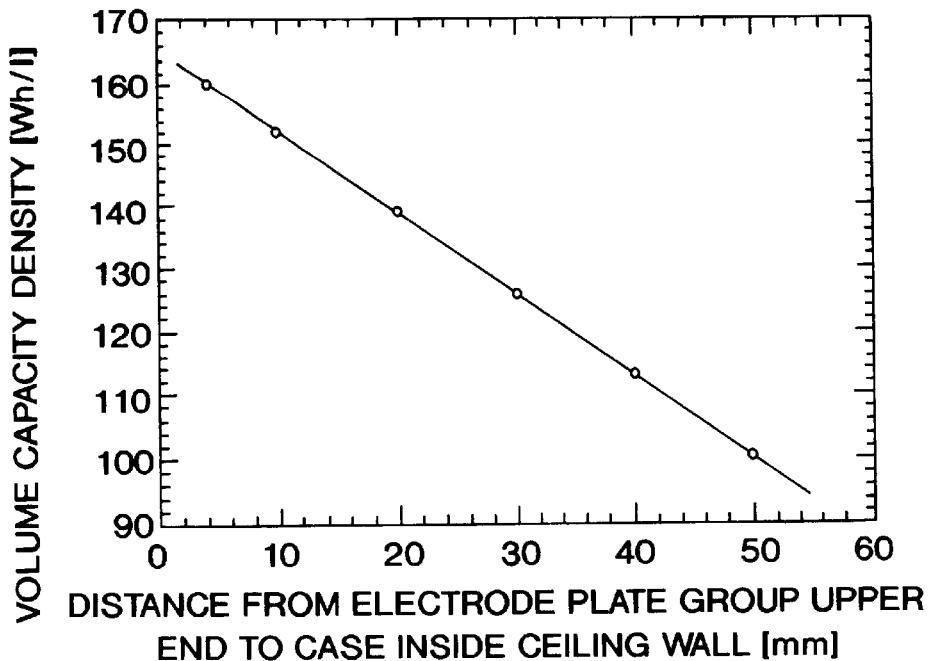
FIG. 8 is a diagram showing the relation of the distance from the upper end of electrode plate to the inside ceiling wall of the cover, and the volume capacity density.
Figure 9:
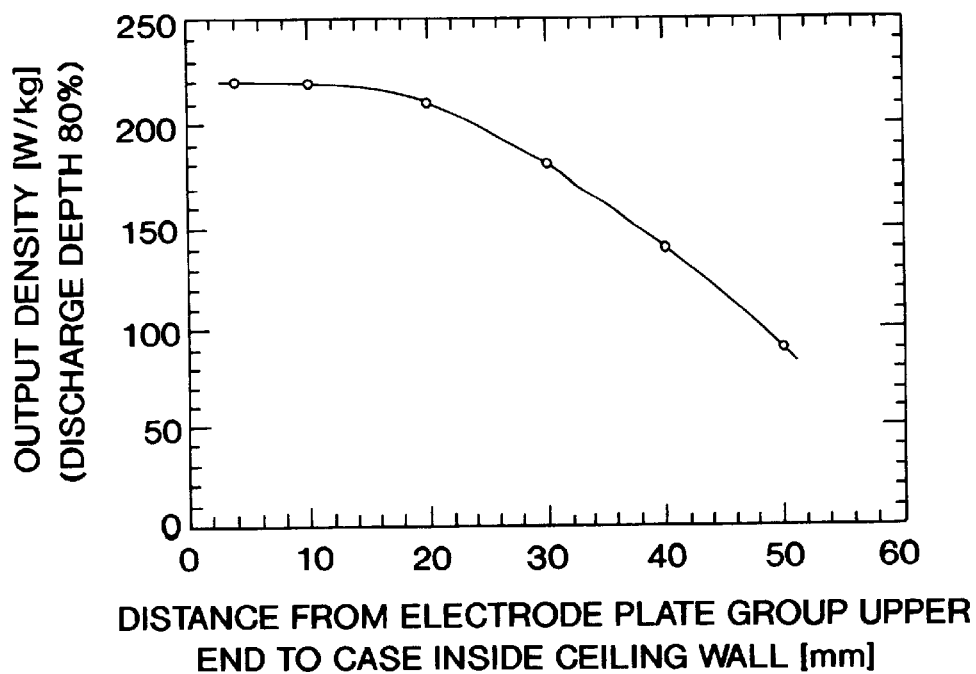
FIG. 9 is a diagram showing the relation of the distance from the upper end of electrode plate to the inside ceiling wall of the cover, and the output density at discharge depth 80%.

In FIG. 8, the axis of ordinates denotes the volume capacity density, and the axis of abscissas represents the distance F from the electrode plate upper end to cover inside ceiling wall. In FIG. 9, the axis of ordinates denotes the output density at discharge depth 80%, and the axis of abscissas represents the distance F from the electrode plate upper end to cover inside ceiling wall. As known from FIG. 8, the volume capacity density decreases linearly as the distance from the electrode plate upper end to cover inside ceiling wall increases. On the other hand, according to FIG. 9, the output density is relatively stable at the distance from the electrode plate upper end to cover inside ceiling wall of 20 mm or less, but it decreases suddenly when exceeding it. To connect the lead plate 9 to the current collector 2f, in order to avoid burning of the separator 8c by the welding heat, a clearance of 4 mm or more is needed. Therefore, to realize high volume capacity density and high output density at the same time, the distance F from the electrode plate upper end to cover inside ceiling wall is preferred to be 4 mm to 20 mm. More preferably, the range should be from 4 mm at which the output density is hardly lowered to 10 mm.

In the storage battery of embodiment 1, the lead plate width G and output density of battery are compared. In the storage battery of embodiment 1, the distance F from the electrode plate upper end to cover inside ceiling wall was defined at 11 mm, lead plate thickness at 0.15 mm, lateral direction auxiliary part height I of lead plate at 4 mm, electrode plate width H at 103 mm, filing or adhesion height J of electrode plate compound at 134 mm, and junction total area at 24 mm$^2$, by connecting the terminals and lead plates by welding.

Figure 10:
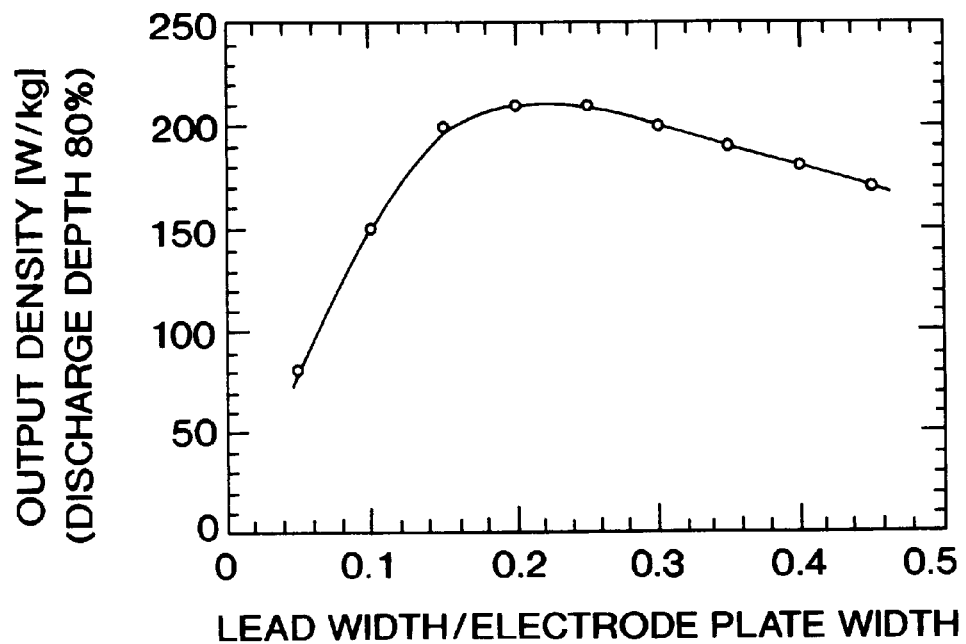
FIG. 10 is a diagram showing the relation of the ratio of lead width to electrode plate width, and the output density at discharge depth 80%.

In FIG. 10, the axis of ordinates denotes the output density at discharge depth 80%, and the axis of abscissas represents the value of the lead plate width G divided by the electrode plate width H. According to FIG. 10, the output density decreases suddenly when the lead plate width is smaller than 0.15 times of the electrode plate width owing to the electric power loss by Joule heat. When exceeding 0.30 times, the decline of the output density due to increase of battery weight exceeds the increment of the output density due to increase of sectional area, and hence the output density drops. Therefore, the lead plate width G is preferred to be 0.15 times to 0.30 times of the electrode plate width H. More preferably, the range should be 0.20 times at which the output density is hardly lowered to 0.25 times.

In the storage battery of embodiment 1, the lead plate thickness and output density of battery are compared. In the storage battery of embodiment 1, the distance F from the electrode plate upper end to cover inside ceiling wall was defined at 11 mm, electrode plate thickness at 0.6 mm, lead plate width G at 14 mm, lateral direction auxiliary part height I of lead plate at 4 mm, electrode plate width H at 103 mm, filling or adhesion height J of electrode plate compound at 134 mm, and junction total area at 24 mm$^2$, by connecting the terminals and lead plates by welding.

Figure 11:
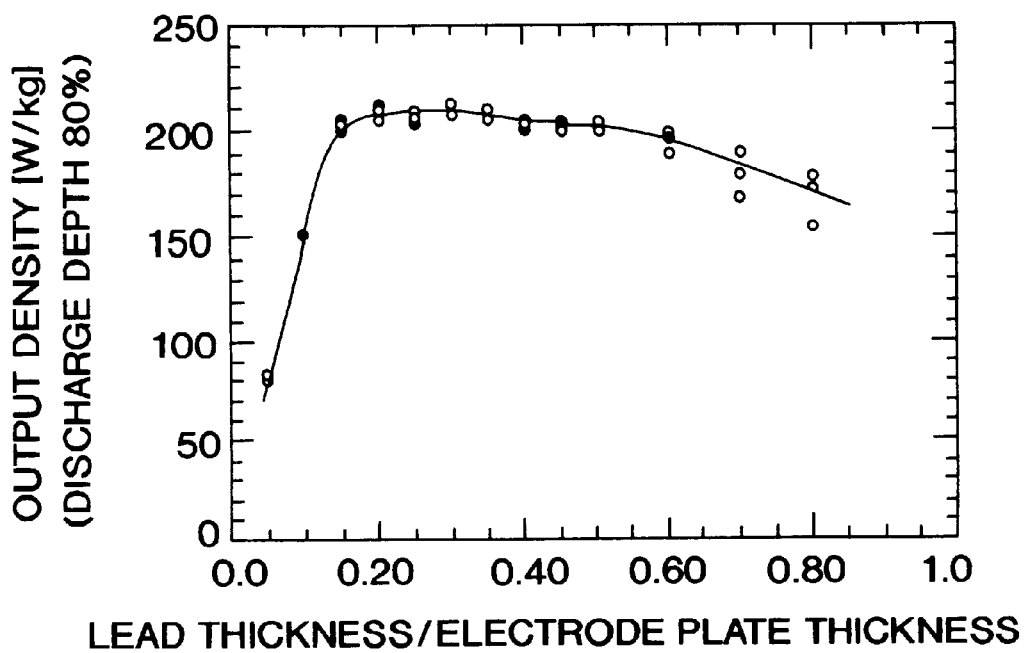
FIG. 11 is a diagram showing the relation of the ratio of lead thickness to electrode plate thickness, and the output density at discharge depth 80%.

In FIG. 11, the axis of ordinates denotes the output density at discharge depth 80%, and the axis of abscissas represents the value of the lead thickness divided by the electrode plate thickness. According to FIG. 11, the output density decreases suddenly when the lead thickness is smaller than 0.175 times of the electrode plate thickness owing to the electric power loss by Joule heat. When exceeding 0.50 times, the decline of the output density due to increase of battery weight exceeds the increment of the output density due to increase of sectional area, and hence the output density drops. Further, when exceeding 0.50 times, the welding area fluctuates, and hence the output density tends to fluctuate. Therefore, the lead plate thickness is preferred to be 0.175 times to 0.50 times of the electrode plate thickness. More preferably, the range should be 0.20 times at which the output density fluctuates less and is hardly lowered to 0.40 times.

Next, in the storage battery of embodiment 1, the lateral direction auxiliary part height I of the lead plate and output density of battery are compared. In the storage battery of embodiment 1, the distance F from the electrode plate upper end to cover inside ceiling wall was defined at 11 mm, lead plate thickness at 0.15 mm, lead plate width G at 14 mm, electrode plate width H at 103 mm, filling or adhesion height J of electrode plate compound at 134 mm, and junction total area at 24 mm$^2$, by connecting the terminals and lead plates by welding.

Figure 12:
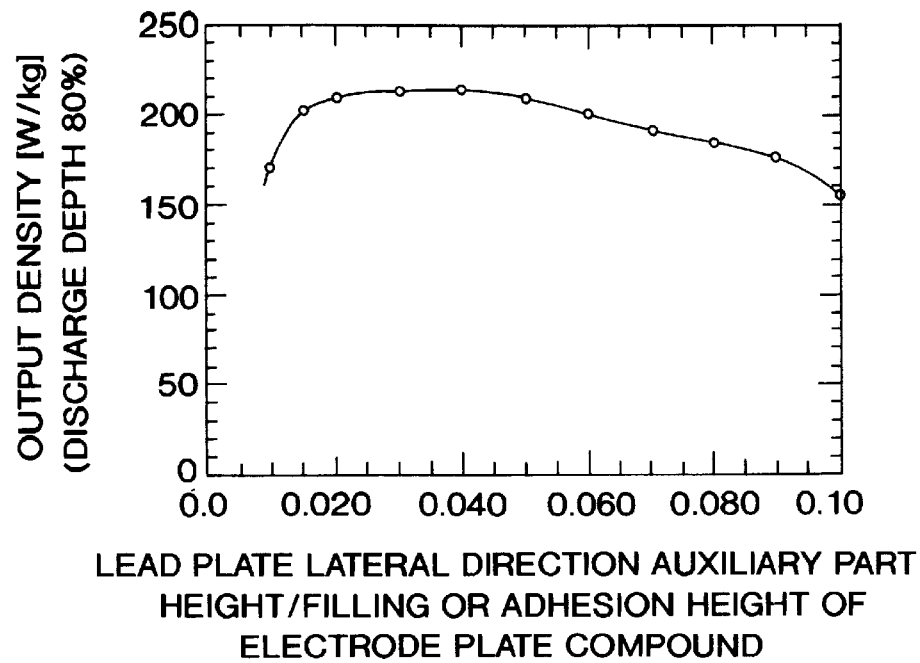
FIG. 12 is a diagram showing the relation of the ratio of the lateral direction auxiliary part height of the lead plate to the filling or adhesion height of the electrode plate compound, and the output density at discharged depth 80%.

In FIG. 12, the axis of ordinates denotes the output density at discharge depth 80%, and the axis of abscissas represents the value of the lateral direction auxiliary part height I of the lead plate divided by the filling or adhesion height J of electrode plate compound. According to FIG. 12, the output density decreases suddenly when the lateral direction auxiliary part height I of the lead plate is smaller than 0.015 times of the filling or adhesion height J of electrode plate compound owing to the electric power loss by Joule heat. When exceeding 0.060 times, the decline of the output density due to increase of battery weight exceeds the increment of the output density due to increase of the lateral direction auxiliary part height I of the lead plate, and hence the output density drops. Or, the larger the value of the lateral direction auxiliary part height I of the lead plate, the more decreases the filling or adhering volume of the electrode plate compound, and hence the volume capacity density of the battery is lowered. Therefore, the lateral direction auxiliary part height I of the lead plate is preferred to be 0.0175 times to 0.060 times of the filling or adhesion height J of electrode plate compound. More preferably, the range should be 0.20 times at which the output density is hardly lowered to 0.50 times.

Further, in the storage battery of embodiment 1, the junction area of terminal and lead plate and output density of battery are compared. In the embodiment, the distance F from the electrode plate upper end to cover inside ceiling wall was defined at 11 mm, lead plate thickness at 0.15 mm, lead plate width G at 14 mm, lateral direction auxiliary part height I of lead plate at 4 mm, electrode plate width H at 103 mm, and filling or adhesion height J of electrode plate compound at 134 mm.

Figure 13:
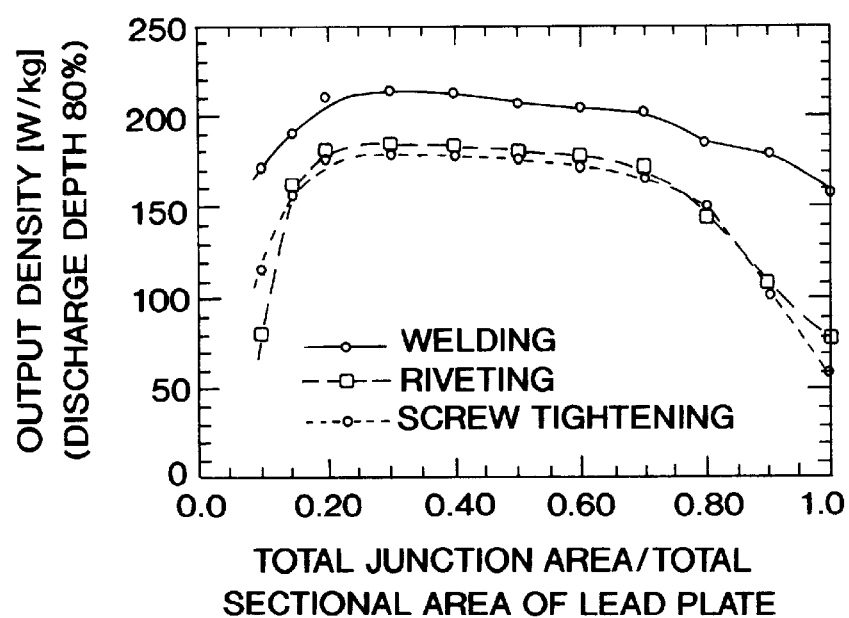
FIG. 13 is a diagram showing the relation of the ratio of the junction total area to the lead plate total sectional area, and the output density at discharge depth 80%.

In FIG. 13, the axis of ordinates denotes the output density at discharge depth 80%, and the junction area is divided by the total sectional area of the bonded lead plates. According to FIG. 13, in the case of welding, the output density decreases suddenly when the junction area is smaller than 0.1 times of the total sectional area of the connected lead plates. When exceeding 0.7 times, uneven welding occurs and the output density fluctuates. The same tendency was noted when the terminals and lead plates were connected by crimping, as represented by riveting, or by screw tightening. In this case, when the junction area is smaller than 0.1 times of the total sectional area of connected lead plates, same as in the case of welding, a sudden decrease is observed by electric power loss due to the Joule heat. When exceeding 0.7 times, the diameter of the rivet or screw is very small, and the connection strength is small, so that the output density decreases suddenly. Further considering that the manufacturing cost is increased when the junction area is wider, the junction area is preferred to be 0.1 times to 0.7 times of the total sectional area of connected lead plates. More preferably, the range should be 0.2 times at which the output density is hardly lowered to 0.4 times.

The most preferable value for the storage battery of embodiment 1 of the invention is 260 W/kg when the value of the sum of electric resistance values of positive side and negative side lead plates and terminals divided by the battery total resistance plotted on the axis of abscissas is 0.04. To realize this, the distance F from the electrode plate upper end to the cover inside ceiling wall should be defined at 4.0 mm, the lead plate width G should be 0.25 times of the electrode plate width H, the lead plate thickness should be 0.30 times of the electrode plate thickness, the lateral direction auxiliary part height I of the lead plate should be 0.040 times of the filling or adhesion height of the electrode plate compound, the junction total area should be 0.3 times of the total sectional area of bonded lead plates, and the terminals and lead plates should be connected by welding.

The invention mainly relates to, as mentioned above, the square type enclosed storage battery having terminals of medium to large capacity, but it may be applied to any shape, including general square type, cylindrical type, and elliptical tubular type.

According to the invention, the terminal has a screw, a pole portion, a sealing groove, a current collector and a flange, and plural current collectors project to the electrode plate group side from said flange, the central axes of said screw, pole portion, sealing groove, current collectors, and flange are nearly on a same line, and said lead plates are divided into plural groups in the positive electrode and negative electrode, and are individually connected to the plural current collectors of said terminals, so that the Joule heat from the lead plates and terminals is decreased. As a result, the square type enclosed storage battery of medium to large capacity having high output density, high reliability, high charging effect, and long life characteristic can be presented.

We claim:
1. A battery comprising:
   an electrode plate group including a plurality of positive plates alternating with a plurality of negative plates, and a plurality of separators disposed in-between the plurality of positive plates and the plurality of negative plates;
   a positive terminal and a negative terminal, each having:
      a flange, and
      first and second current collectors coupled to the flange;
   wherein the first and the second current collectors of the positive terminal are coupled to a plurality of plate leads which in turn are coupled to the plurality of positive plates, and the first and the second current collectors of the negative terminal are coupled to a further plurality of plate leads which in turn are coupled to the plurality of negative plates.

2. A battery as recited in claim 1, further comprises a screw, a pole portion, and a sealing groove each having a central axis, which coincide with a central axis of the flange.

3. A battery as recited in claim 1, wherein a stopper is provided in the flange of each of the positive terminal and the negative terminal, and the length of the stopper is between about 25 mm to 45 mm.

4. A battery as recited in claim 1, wherein each of the first and second current collectors of the positive terminal and negative terminal have a width between about 1 mm and 5 mm, and each of the first and second current collectors of the positive terminal and negative terminal have a height between about 2 mm and 10 mm.

5. A battery as recited in claim 1, wherein
   a sum of a first electric resistance value associated with the plurality of plate leads and a second electric resistance value associated with the positive terminal and a third electric resistance value associated with the negative terminal is between about 0.04 times and 0.30 times of a fourth electric resistance value between the positive terminal and the negative terminal.

6. A battery as recited in claim 1, further including a case accommodating the electrode plate group wherein a distance from a top of the electrode plate group to a bottom of a cover for sealing the case is between about 4 mm and 20 mm.

7. A battery as recited in claim 1, wherein each of the positive terminal and the negative terminal has a pole portion having a diameter of between about 12 mm and 20 mm.

8. A battery as recited in claim 1, wherein the flange of each of the positive terminal and the negative terminal has a thickness of between about 2 mm and 10 mm.

9. A battery as recited in claim 1, wherein each of the plurality of plate leads has a width which is between about 0.15 times and 0.30 times a width of a positive plate of the plurality of positive plates and the width of each of the plurality of plate leads is between about 0.15 times and 0.30 times a width of a negative plate of the plurality of negative plates.

10. A battery as recited in claim 1, wherein each of the plurality of plate leads has a thickness which is between 0.175 times and 0.50 times a thickness of a positive plate of the plurality of positive plates and the thickness of each of the plurality of plate leads is between 0.175 times and 0.50 times a thickness of a negative plate of the plurality of negative plates.

11. A battery as recited in claim 1, wherein a first height of a first auxiliary part, placed on a first upper end of a positive plate of the plurality of positive plates in a lateral direction, is between about 0.0175 times and 0.060 times of a first adhesion height of the positive plate of the plurality of positive plates and a second height of a second auxiliary part, placed on a second upper end of a negative plate of the plurality of negative plates in a lateral direction, is between about 0.0175 times and 0.060 times of a second adhesion height of the negative plate of the plurality of negative plates.

12. A battery as recited in claim 1, wherein a total area of a junction of one of the positive terminal and the negative terminal and ones of the plurality of plate leads is between 0.1 times and 0.7 times of a total sectional area of the ones of the plurality of lead plates connected to one of the plurality of current collectors.

13. A battery as recited in claim 1, wherein ones of the plurality of plate leads are connected to one of the positive terminal and the negative terminal by at least one of welding, screw tightening, and crimping.

14. A battery as recited in claim 2, wherein a stopper is provided in the flange of each of the positive terminal and the negative terminal, and a length of the stopper is between about 25 mm to 45 mm.

15. A battery as recited in claim 2, wherein a width of each of the first and second current collectors coupled to the flange is between about 1 mm and 5 mm, and a height of each of the first and second current collectors projecting from the flange is between about 2 mm and 10 mm.

16. A battery as recited in claim 2, wherein
a sum of a first electric resistance value associated with the plurality of plate leads and a second electric resistance value associated with a positive terminal of the plurality of terminals and a third electric resistance value associated with a negative terminal of the plurality of terminals is between about 0.04 times and 0.30 times of a fourth electric resistance value between the positive terminal and the negative terminal.

17. A battery as recited in claim 2, further including a case accommodating the electrode plate group, and a cover for sealing said case, wherein a distance from a top of the electrode plate group to a bottom of the cover is between about 4 mm and 20 mm.

18. A battery as recited in claim 2, wherein a diameter of the pole portion of each of the positive terminal and the negative terminal is between about 12 mm and 20 mm.

19. A battery as recited in claim 2, wherein a width of each of the plurality of plate leads is between about 0.15 times and 0.30 times a width of a positive plate of the plurality of positive plates and the width of each of the plurality of plate leads is between about 0.15 times and 0.30 times a width of a negative plate of the plurality of negative plates.

20. A battery as recited in claim 2, wherein a thickness of each of the plurality of plate leads is between about 0.175 times and 0.50 times of a thickness of a positive plate of the plurality of positive plates and a thickness of each of the plurality of plate leads is between about 0.175 times and 0.50 times of a thickness of a negative plate of the plurality of negative plates.

21. A battery as recited in claim 2, wherein a first height of a first auxiliary part, placed on a first upper end of a positive plate of the plurality of positive plates in the lateral direction, is between about 0.0175 times and 0.060 times of a first adhesion height of the positive plate of the plurality of positive plates and a second height of a second auxiliary part, placed on a second upper end of a negative plate of the plurality of negative plates in the lateral direction, is between about 0.0175 times and 0.060 times of a second adhesion height of the negative plate of the plurality of negative plates.

22. A battery as recited in claim 2, wherein a total area of a junction of one of the positive terminal and the negative terminal and ones of the plurality of plate leads is between 0.1 times and 0.7 times of total sectional area of the ones of the plurality of lead plates connected to one of the plurality of current collectors.

23. A battery as recited in claim 2, wherein ones of the plurality of plate leads are connected to one of the plurality of terminals by at least one of welding, screw tightening, and crimping.

24. A battery as recited in claim 1, wherein one of said terminals further includes a screw, a pole portion and a sealing groove.

25. A battery as recited in claim 2, wherein a thickness of the flange of each of the positive terminal and the negative terminal is between about 2 mm and 10 mm.

* * * * *

UNITED STATES PATENT AND TRADE MARK OFFICE
CERTIFICATE OF CORRECTION

PATENT NO. : 6,027,831
DATED : February 22, 2000
INVENTOR(S) : Inoue et al.

It is certified that error appears in the above-identified patent and that said Letters Patent is hereby corrected as shown below:

Title Page, item [57] Abstract, last line, after "cover" insert --1.--.

Signed and Sealed this

Twenty-seventh Day of March, 2001

Attest:

NICHOLAS P. GODICI

*Attesting Officer*

*Acting Director of the United States Patent and Trademark Office*